(12) United States Patent
Matsumoto et al.

(10) Patent No.: US 12,099,189 B2
(45) Date of Patent: Sep. 24, 2024

(54) DISPLAY DEVICE AND OPTICAL UNIT

(71) Applicant: SEIKO EPSON CORPORATION, Tokyo (JP)

(72) Inventors: Daiki Matsumoto, Suwa (JP); Takashi Takeda, Suwa (JP); Toshiyuki Noguchi, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 287 days.

(21) Appl. No.: 17/513,889

(22) Filed: Oct. 29, 2021

(65) Prior Publication Data

US 2022/0137416 A1    May 5, 2022

(30) Foreign Application Priority Data

Oct. 29, 2020   (JP) .................................. 2020-181265

(51) Int. Cl.
*G09G 5/02*    (2006.01)
*G02B 5/04*    (2006.01)
*G02B 27/01*   (2006.01)

(52) U.S. Cl.
CPC ........... *G02B 27/0172* (2013.01); *G02B 5/04* (2013.01); *G02B 2027/0178* (2013.01)

(58) Field of Classification Search
CPC .................. G02B 27/0172; G02B 5/04; G02B 2027/0178; G02B 17/0816; G02B 27/0006; G02B 17/0856
USPC ....................................................... 345/593
See application file for complete search history.

(56) References Cited

U.S. PATENT DOCUMENTS

| | | | |
|---|---|---|---|
| 6,160,666 A | 12/2000 | Rallison et al. | |
| 2002/0131261 A1* | 9/2002 | Inui ..................... | G02B 6/006 362/612 |
| 2006/0152821 A1* | 7/2006 | Takahashi .......... | G02B 17/0832 359/726 |
| 2007/0091447 A1 | 4/2007 | Inoguchi | |
| 2009/0168131 A1* | 7/2009 | Yamaguchi ........ | G02B 27/0176 359/9 |
| 2018/0143427 A1* | 5/2018 | Griffin ................ | G02B 17/086 |
| 2020/0073127 A1 | 3/2020 | Takeda et al. | |
| 2021/0063749 A1 | 3/2021 | Takeda et al. | |

FOREIGN PATENT DOCUMENTS

| | | |
|---|---|---|
| JP | H09508711 | 9/1997 |
| JP | 2000010042 | 1/2000 |
| JP | 2000227575 | 8/2000 |
| JP | 2007101790 | 4/2007 |
| JP | 2020034721 | 3/2020 |
| JP | 2020034722 | 3/2020 |
| JP | 2021033154 | 3/2021 |

* cited by examiner

*Primary Examiner* — Gordon G Liu
(74) *Attorney, Agent, or Firm* — JCIPRNET

(57) ABSTRACT

A display device includes an image element, a prism mirror that receives image light emitted from the image element through a light incident surface, reflects the image light with an inner reflection surface, and emits the image light from a light emission surface, and a see-through mirror that reflects the image light emitted from the prism mirror toward a pupil position, wherein the prism mirror emits the image light incident from a front to be bent in a direction inclined with respect to the front, and a light emission side of an image source that includes the image element and the prism mirror is covered with a light transmission window that blocks dust.

18 Claims, 9 Drawing Sheets

DISPLAY DEVICE AND OPTICAL UNIT

The present application is based on, and claims priority from JP Application Serial Number 2020-181265, filed Oct. 29, 2020, the disclosure of which is hereby incorporated by reference herein in its entirety.

BACKGROUND

1. Technical Field

The present disclosure relates to a see-through type display device and an optical unit that enable observation of a virtual image, and particularly relates to a display device and an optical unit of a type in which image light from an image source is caused to be incident on a see-through mirror and reflected light from the see-through mirror is observed.

2. Related Art

As a see-through type display device, there is one in which a zigzag optical path is formed by two obliquely incident mirrors, and image light from a display element is incident on the eyes of a user via the zigzag optical path (refer to JP-A-2020-34722).

In such a see-through type display device of JP-A-2020-34722, because it is necessary to ensure a region in which an external scene is visible, the arrangement of optical components is limited, and in particular, because the see-through mirror that covers the front of the eyes is disposed and exposed separately from an optical element in front thereof, it is necessary to avoid contamination of the optical elements on the side in front and the side behind thereof due to dust or dirt.

SUMMARY

A display device according to one aspect of the present disclosure includes an image element, a prism mirror that receives image light emitted from the image element through a light incident surface, reflects the image light with an inner reflection surface, and emits the image light from a light emission surface, and a see-through mirror that reflects the image light emitted from the prism mirror toward a pupil position, wherein the prism mirror emits the image light such that it is bent in a direction inclined with respect to an incident direction, and a light emission side of an image source that includes the image element and the prism mirror is covered with a light transmission window that blocks dust.

DESCRIPTION OF EXEMPLARY EMBODIMENTS

First Embodiment

Hereinafter, a display device of a first embodiment according to the present disclosure and an optical unit incorporated therein will be described with reference to FIGS. 1 to 3 and the like.

Figure 1:
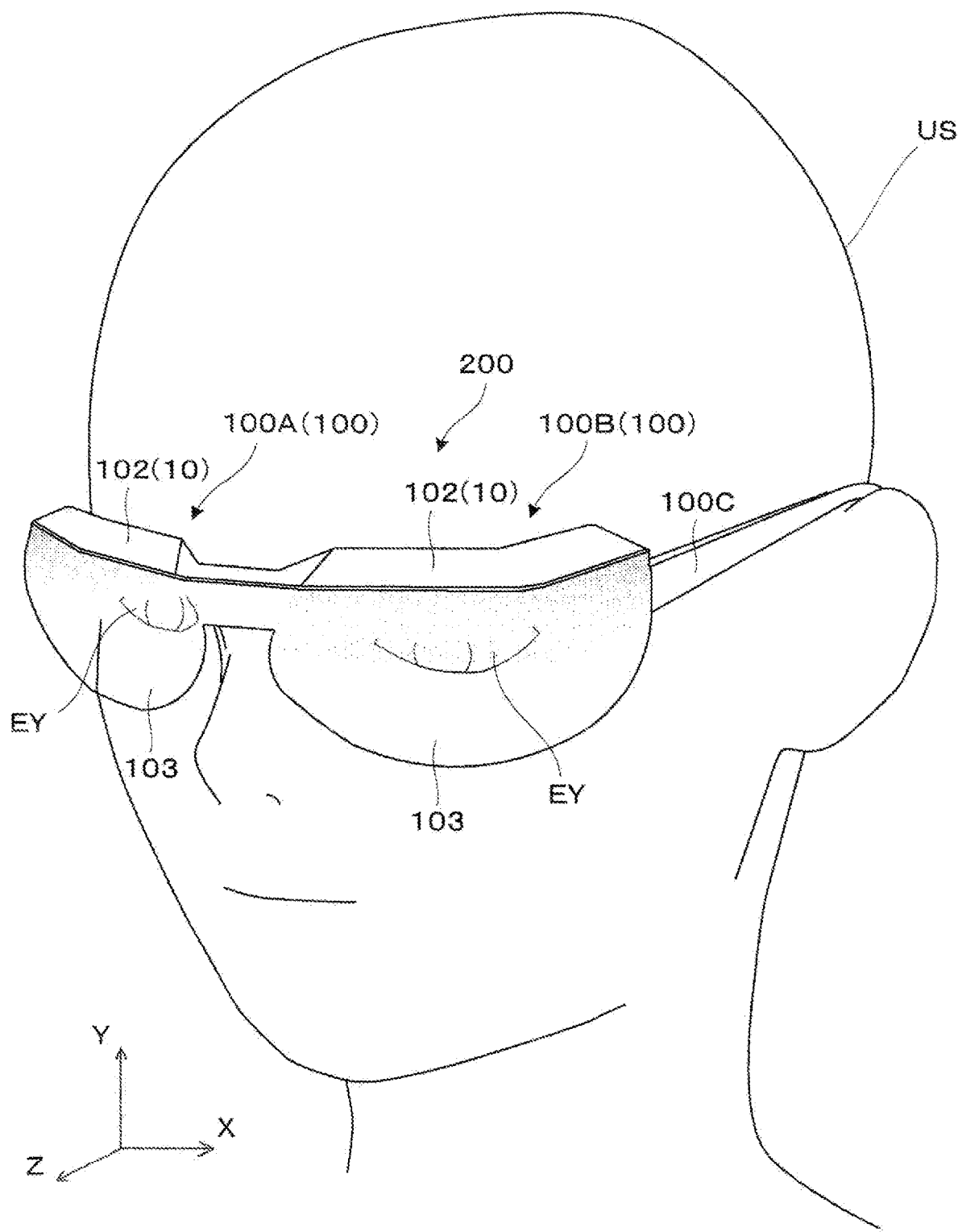
FIG. 1 is an external perspective view showing a mounted state of a display device according to a first embodiment.

FIG. 1 is a diagram showing a mounted state of a head-mounted display (hereinafter, also referred to as "HMD") 200, and the HMD 200 allows an observer or wearer US who is wearing the HMD 200 to be able to recognize an image as a virtual image. In FIG. 1 and the like, X, Y, and Z are an orthogonal coordinate system, a +X direction corresponds to a transverse direction in which the two eyes EY of an observer or wearer US who is wearing the HMD 200 or a display device 100 are disposed, a +Y direction corresponds to an upward direction orthogonal to the transverse direction in which the two eyes EY of the wearer US are disposed, and a +Z direction corresponds to a direction to the front or a forward direction for the wearer US. A ±Y direction is parallel to a vertical axis or a vertical direction.

The HMD 200 includes a first display device 100A for the right eye, a second display device 100B for the left eye, and a pair of temple type support devices 100C that support the display devices 100A and 100B. The first display device 100A includes a display drive part 102 disposed at an upper portion thereof, and an exterior member 103 that has a spectacle lens shape and covers the front of the eye. Similarly, the second display device 100B is constituted of a display drive part 102 disposed at an upper portion thereof, and an exterior member 103 that has a spectacle lens shape and covers the front of the eye. In the first display device 100A and the second display device 100B, the display drive part 102 is a main part for forming an image, and the display drive part 102 is also referred to as an image source 10. The support device 100C supports the upper end side of the exterior member 103 via the display drive part 102. The first display device 100A and the second display device 100B are optically inverted left and right, and hereinafter, the first display device 100A for the right eye will be described as a representative display device 100.

Figure 2:
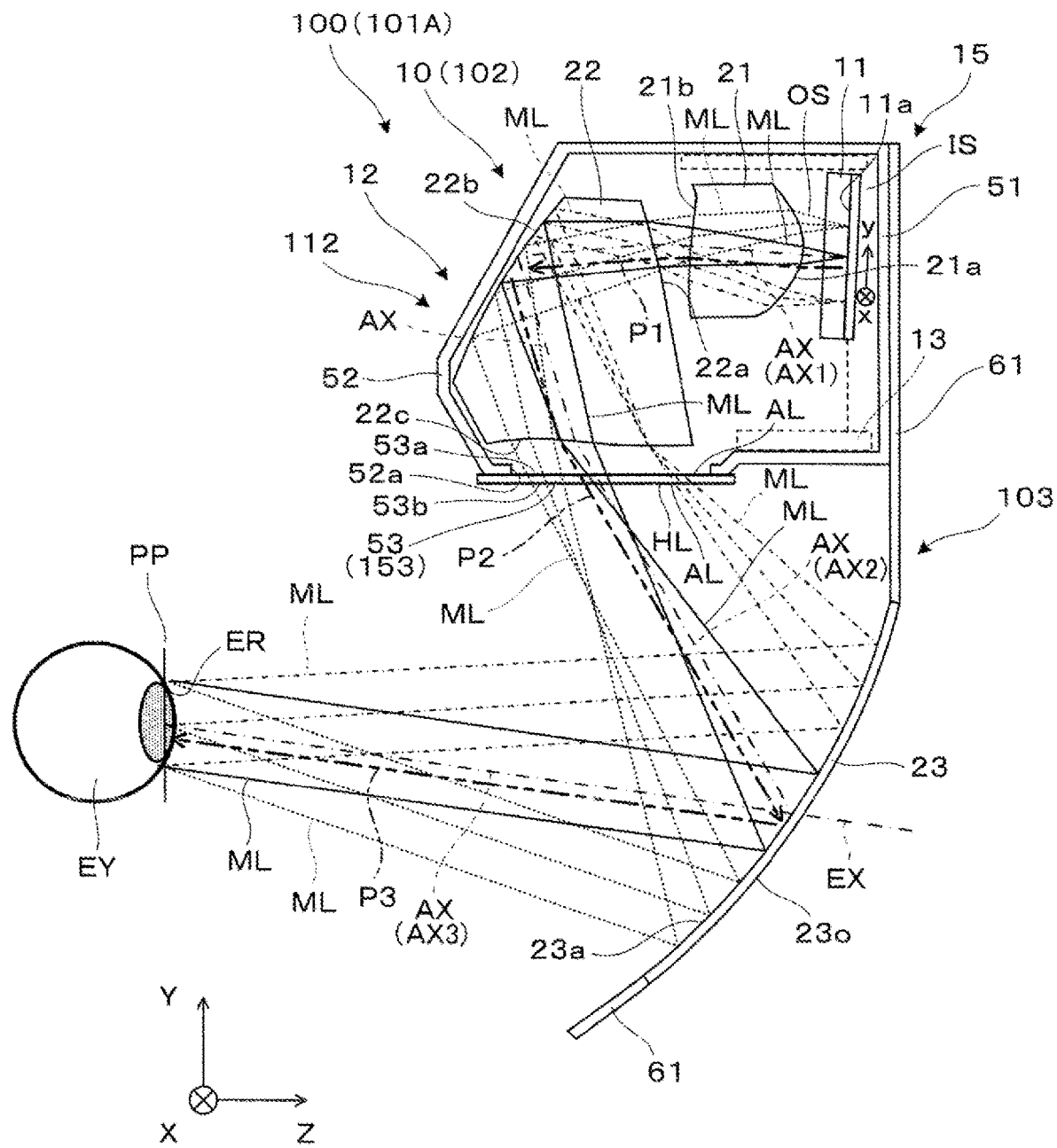
FIG. 2 is a side cross-sectional view showing an internal structure of the display device.

FIG. 2 is a side cross-sectional view showing an optical structure of the display device 100. As shown, the display device 100 includes an image element 11, an imaging optical system 12, and a display control circuit 13. However, in the specification, a device excluding the display control circuit 13 is also referred to as a display device 100 from the viewpoint of achieving an optical function. The image element 11 and the display control circuit 13 are supported in a case 51 that is an outer frame of the display drive part 102 shown in FIG. 1, and a part of the imaging optical system 12 is also supported in the case 51 of the display drive part 102.

The image element 11 is a light emitting type display device. The image element 11 is, for example, a micro LED display and forms a color still image or video on a two-dimensional display surface 11a. The image element 11 is disposed along an x-y axis plane that is inclined by being slightly rotated about the X axis with respect to an X-Y plane. The image element 11 is driven by the display control circuit 13 to perform a display operation. The image element 11 is not limited to the micro LED display, and can be replaced with a display device using organic electroluminescence (EL), an inorganic EL, an organic LED, a laser array, a quantum dot light emission element, or the like. The image element 11 is not limited to the spontaneous light emission type image light generation device, may include an LCD or another light modulation element, and may form an image by illuminating the light modulation element with a light source such as a backlight. As the image element 11, a liquid crystal on silicon (LCOS) (LCoS is a registered trademark), a digital micro-mirror device, or the like may be used instead of the LCD.

The imaging optical system 12 includes a projection lens 21, a prism mirror 22, and a see-through mirror 23. In the present embodiment, an optical path from the image element 11 to the prism mirror 22 is disposed above an upper end of the see-through mirror 23, but may also be disposed at a position which is partially lower than the upper end of the see-through mirror 23 in a range in which an optical path of image light ML incident on the eye EY is not obstructed. That is, the image element 11, the projection lens 21, and the prism mirror 22 may be disposed at positions which are partially lower than the upper end of the see-through mirror 23 in the range in which the optical path of the image light ML incident on the eye EY is not obstructed.

The projection lens 21 focuses the image light ML emitted from the image element 11 into a state close to a parallel luminous flux. The projection lens 21 is a single lens, and has an incident surface 21a and an emission surface 21b. The prism mirror 22 has a light incident surface 22a, an inner reflection surface 22b, and a light emission surface 22c, and causes the image light ML emitted from the projection lens 21 to be incident on the light incident surface 22a, to be totally reflected by the inner reflection surface 22b, and to be emitted from the light emission surface 22c. At this time, the prism mirror 22 emits the image light ML incident from the front such that it is bent in a direction inclined with respect to an incident direction (a direction of the light source seen from the prism mirror 22). In the case of an optical system that is eccentric in an up-down direction as in the present embodiment, in front of the optical path includes that within a range of about 45° up and down with respect to the +Z direction, and a direction inclined with respect to the incident direction includes that within a range of about 45° up and down with respect to an intermediate direction formed at 45° with respect to the +Z direction and the −Y direction. The see-through mirror 23 reflects the image light ML emitted from the prism mirror 22 toward a pupil position PP. The pupil position PP is a position at which the image light ML from each of points on the display surface 11a is incident to overlap from an angular direction corresponding to a position of each of points on the display surface 11a in a predetermined divergent state or a parallel state. A field of view (FOV) of the display device 100 including the imaging optical system 12 shown is 44°, for example. A display region of the virtual image due to the display device 100 has a rectangular shape, and this 44° is in a diagonal direction.

The projection lens 21 and the prism mirror 22 are accommodated in the case 51 together with the image element 11. A combination of the image element 11, the projection lens 21, and the prism mirror 22, which includes the case 51, is referred to as an optical unit 15 in the specification. The case 51 is formed of a light shielding material and, in the case of the present embodiment, has the built-in display control circuit 13 that operates the image element 11. A main body of the case 51 is a frame 52 having airtightness, and the frame 52 is formed of a metal material or a resin material. In the case of a resin material, a black light-shielding material may be applied to the inner surface side thereof. The frame 52 supports the image element 11, the projection lens 21, and the prism mirror 22 by a member (not shown) protruding inward. When the image element 11 and the prism mirror 22 are supported by the frame 52 having air tightness, it is possible to avoid contamination of the optical surface of the prism mirror 22 and the display surface of the image element 11 due to dust, dirt, or the like. Here, the frame 52 has an opening 52a in the vicinity of the prism mirror 22, and causes the image light ML to be emitted outside the display drive part 102 or outside the image source 10. The image light ML emitted outside the display drive part 102 through the opening 52a is incident on the inside of the see-through mirror 23. The opening 52a is sealed by a flat plate-shaped light transmission member 53 having rigidity. In other words, the case 51 blocks an interior IS from dust, water droplets, and external air, and air-tightly or liquid-tightly seals an optical path space OS from the image element 11 to the prism mirror 22.

The light transmission member 53 serves as a light transmission window 153 that covers the light emission side of the display drive part 102 or the image source 10 and transmits the image light ML. The light transmission window 153 shields the inside of the case 51 from dust and dirt. In a case in which the light transmission window 153 and the case 51 block dust, as in the present embodiment, a case in which the light transmission window 153 and the like air-tightly or liquid-tightly seal the optical path space OS from the image element 11 to the prism mirror 22 may be included. Because the light transmission member 53 as the light transmission window 153 has rigidity, it is easy to prevent damage to the light transmission member 53, that is, the light transmission window 153, and it is possible to ensure a low weight while affecting optical performance is avoided due to the light transmission member 53 having a flat plate shape. The light transmission member 53 is disposed between the prism mirror 22 and the see-through mirror 23 as a result of it being disposed on the light emission side of the prism mirror 22. The light transmission member 53 or the light transmission window 153 is disposed between the prism mirror 22 and the see-through mirror 23, thereby protecting an optical surface of the prism mirror 22.

As described above, the optical unit 15 has a structure in which the image element 11, the prism mirror 22, and the like are built into the case 51 having a shielding structure or sealing structure with a light transmission window 153 to protect the prism mirror 22 and the like from dust or dirt, but the see-through mirror 22 is exposed to the outside of the optical unit 15 while being supported by the optical unit 15.

The light transmission member 53 is a parallel flat plate having a thickness of approximately 0.5 to 2 mm. In other words, an incident surface 53a and an emission surface 53b are flat optical surfaces. The strength of the light transmission member 53 can be ensured, and generation of an interference fringe due to the light transmission member 53 can be prevented by setting the thickness of the light transmission member 53 to be 0.5 mm or greater. Further, an increase in a weight of the light transmission member 53 is prevented, and a low weight of the display drive part 102 can be achieved by setting the thickness of the light transmission member 53 to be 2 mm or less. The light transmission member 53 may be formed of a resin plate having rigidity, and may be formed of a dust-proof glass. When the light transmission member 53 is formed of a resin plate, a low weight can be easily achieved, and a likelihood of breakage can be reduced. A high-performance optical surface can be formed on the dust-proof glass, and the optical performance of the display device 100 can be easily maintained. The light transmission member 53 preferably has a low refractive index even when it is formed of glass, or even when it is formed of a resin. When the light transmission member 53 is formed of a resin plate, an antireflection layer AL is formed on the incident surface 53a, and a hard coating layer HL and an antireflection layer AL are formed on the emission surface 53b. Generation of a ghost can be curbed by such an antireflection layer AL. The hard coating layer HL formed on the emission surface 53b prevents the light emission window from being damaged by an external force, and curbs deterioration of the optical performance due to use. Antifouling properties can be exhibited by imparting water repellency to a surface of the coating formed on the emission surface 53b. When the light transmission member 53 is formed of dust-proof glass, the antireflection layer AL is formed on the incident surface 53a or the emission surface 53b, but the hard coating layer HL is not formed.

It is possible to prevent the optical surface of the optical elements built into the display drive part 102, such as the prism mirror 22, from being contaminated with dust or dirt by covering the opening 52a of the case 51 with the light transmission member 53. The light transmission member 53 has a dust-proof function, as well as a drip-proof and moisture-proof function of preventing infiltration of moisture, and also has a function of preventing contact of a finger or other objects with the optical surface.

The light transmission member 53 has substantially no optical power as a result of it being a parallel plate, and allows the image light ML to pass therethrough with little influence on image formation and without attenuation. The light transmission member 53 is not limited to a parallel flat plate, and may be a plate-like body having a wedge angle. For the light transmission member 53, the incident surface 53a and the emission surface 53b may be optical surfaces such as spherical surfaces, aspherical surfaces, or freely-curved surfaces.

In the shown example, the display control circuit 13 is disposed in the case 51, but the display control circuit 13 may be disposed outside the case 51. The image element 11 does not need to be disposed in the case 51 either, and an opening for the image element 11 may be provided in the case 51, and the image element 11 may be fixed to the case 51 so that the display surface 11a faces the interior IS of the case 51 via the opening.

The frame 52 of the case 51 supports the see-through mirror 23 via a support plate 61. In this case, the see-through mirror 23 is stably supported by the prism mirror 22 or the like via the frame 52. The see-through mirror 23 and the support plate 61 correspond to the exterior member 103 shown in FIG. 1. That is, the see-through mirror 23 is part of the exterior member 103. The exterior member 103 may also serve as a shade. When the exterior member 103 serves as a shade, a transparent region that allows observation of the external scene may be formed in the support plate 61. The transparent region of the support plate 61 and the outer side thereof may have darkening characteristics and light-shielding properties. In this case, the see-through mirror 23 serves as part of the shade, and can have continuity in terms of transmission of outside light and the like in a boundary region between the see-through mirror 23 and the support plate 61.

Figure 3A:
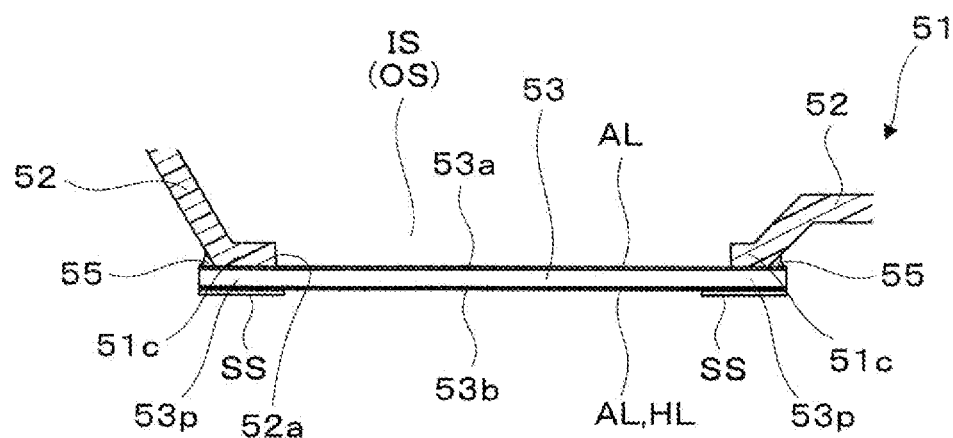
FIG. 3A is a partially enlarged cross-sectional view showing a method for fixing a light transmission member to a case.

FIG. 3A is a partially enlarged cross-sectional view showing a method for fixing the light transmission member 53 to the case 51. The light transmission member 53 is supported by a seat 51c provided around the opening 52a of the case 51 or the frame 52. The light transmission member 53 is fixed with sufficient strength to the seat 51c of the case 51 by an adhesive 55 on the incident surface 53a side of an outer edge portion 53p. The opening 52a has an oval or rectangular shape, and the seat 51c extends annularly to be aligned with the opening 52a. The adhesive 55 is also provided in an annular shape along the outer edge portion 53p. Thus, the inside and outside of the light transmission member 53 are blocked and separated, and it is possible to prevent external dust, moisture, vapor, and the like from entering the interior IS. The opening 52a needs to be wider than the optical path of the image light ML, but has a minimum necessary size from the viewpoint of curbing passage of light that causes stray light. When the opening 52a is formed to be wider than the optical path of the image light ML, a light shielding part SS may also be provided on the side peripherally outward from the light transmission member 53. The light shielding part SS is formed by applying a black light-shielding material or affixing a black light shielding sheet. The light shielding part SS may be formed collectively by molding the light transmission member 53 in two colors. The generation of stray light can be prevented by the light shielding part SS, and it is possible to prevent unwanted light rays from being incident on an eye ring ER.

The adhesive 55 that fixes the light transmission member 53 may have elasticity after curing. When the adhesive 55 has elasticity after curing, it is possible to prevent occurrence of distortion in the light transmission member 53. For example, a silicon-based adhesive may be used as the adhesive 55 having elasticity.

Figure 3B:
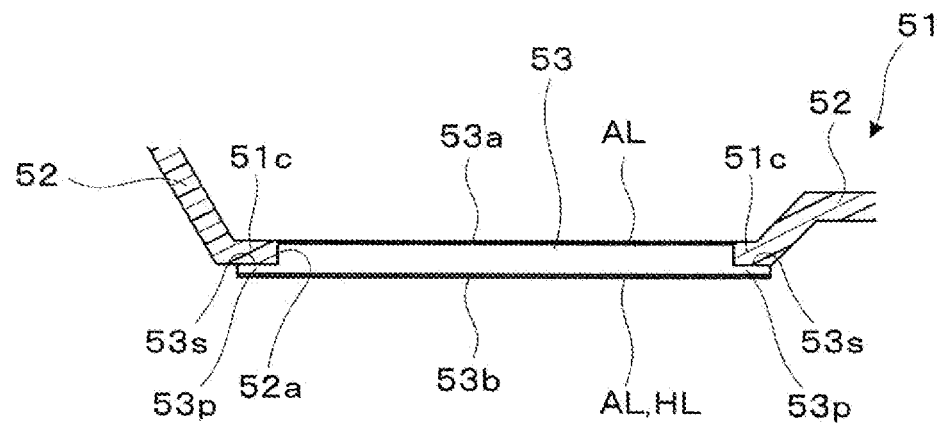
FIG. 3B is a partially enlarged cross-sectional view showing a fixing method according to a modified example.

FIG. 3B shows a modified example of the fixing method shown in FIG. 3A. In this case, an annular step 53s is provided on the outer edge portion 53p of the light transmission member 53, and is fitted to the seat 51c of the case 51. Although not shown in the drawings, the fixing of the light transmission member 53 can be ensured by interposing an adhesive between a surface of the step 53s and a lower surface of the seat 51c. Although detailed description is omitted, a step may be provided in the seat 51c of the case 51, and the outer edge portion 53p of the light transmission member 53 may be fitted to this step.

Figure 3C:
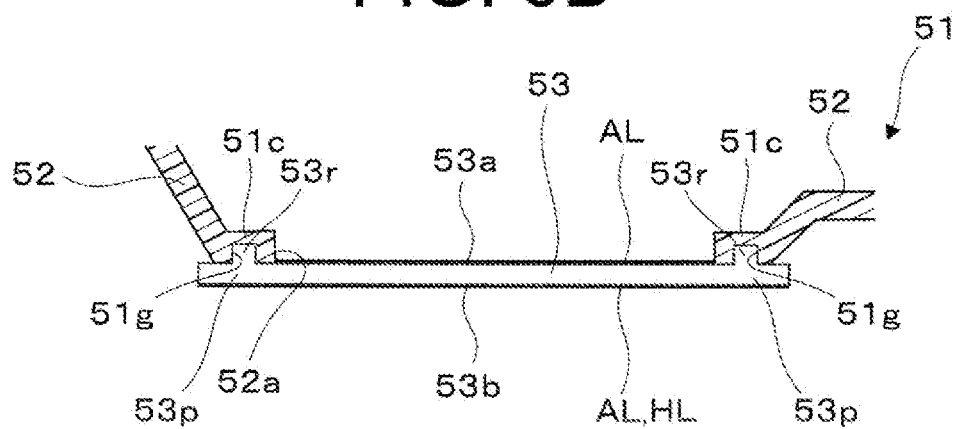
FIG. 3C is a partially enlarged cross-sectional view showing a fixing method according to another modified example.

FIG. 3C shows another modified example of the fixing method shown in FIG. 3A. In this case, an annular protrusion 53r is provided on the outer edge portion 53p of the light transmission member 53, an annular groove 51g is provided in the seat 51c of the case 51, and the protrusion 53r of the light transmission member 53 is fitted into the groove 51g of the case 51. Although not shown in the drawings, the fixing of the light transmission member 53 may be ensured by interposing an adhesive between the protrusion 53r and the groove 51g. Although detailed description is omitted, a protrusion may be provided on the seat 51c of the case 51, a groove may be provided in the outer edge portion 53p of the light transmission member 53, and the protrusion of the case 51 may be fitted into the grooves of the light transmission member 53.

A sealing member formed of a material such as rubber may be assembled at and around a joint portion between the case 51 and the light transmission member 53 shown in FIGS. 3A to 3C. In this case, even if the adhesive is not provided seamlessly along the outer edge portion 53p of the light transmission member 53, reliable sealing is possible.

Returning to FIG. 2, the imaging optical system 12 is an off-axis optical system 112 due to the see-through mirror 23 being a concave mirror. In the case of the present embodiment, the projection lens 21, the prism mirror 22, and the see-through mirror 23 are disposed to be non-axially symmetrical and have an optical surface that is non-axisymmetric. The fact that the imaging optical system 12 is an off-axis optical system 112 means that the optical path is bent before and after light rays are incident on at least one reflection surface or refraction surface in the optical elements 21, 22, and 23 constituting the imaging optical system 12. In this imaging optical system 12, that is, the off-axis optical system 112, an optical axis AX is bent so that the optical axis AX extends along an off-axis surface (a surface parallel to a Y-Z plane) corresponding to a plane of the drawing. In this imaging optical system 12, the optical elements 21, 22, and 23 are arranged along the off-axis surface by bending the optical axis AX in the off-axis surface parallel to the Y-Z plane. The imaging optical system 12 includes optical axis portions AX1, AX2, and AX3 that are disposed along the off-axis surface (a surface parallel to the Y-Z plane) which is a predetermined reference surface and are inclined with respect to each other before and after the reflection surface. The optical axis AX as a whole extends along an optical path of a main ray emitted from the center of the image element 11 and passes through the center of the eye ring ER or the pupil corresponding to an eye point. The optical axis AX includes the plurality of optical axis portions AX1, AX2, and AX3, and is disposed in a Z shape when seen in a transverse cross section. In other words, in the off-axis surface parallel to the Y-Z plane, an optical path P1 from the projection lens 21 to an inner reflection surface 22b, an optical path P2 from the inner reflection surface 22b to the see-through mirror 23, and an optical path P3 from the see-through mirror 23 to the pupil position PP are bent in a Z shape in two stages. The imaging optical system 12 is arranged vertically. In other words, the off-axis surface (the surface parallel to the Y-Z plane) which is a predetermined reference plane extends in the Y direction which is an up-down direction. In this case, the optical elements 21, 22, and 23 constituting the display device 100 are arranged so that height positions thereof are changed in the up-down direction, and an increase in a transverse width of the display device 100 can be prevented.

In the imaging optical system 12, the optical path P1 from the projection lens 21 to the inner reflection surface 22b is in a state nearly parallel to the Z direction. That is, in the optical path P1, the optical axis portion AX1 extends substantially parallel to the Z direction or a forward direction. As a result, the projection lens 21 is disposed between the prism mirror 22 and the image element 11 in the Z direction or the forward direction. The optical axis portion AX1 in the optical path P1 is preferably kept within a range of approximately −30° to +30° in the Z direction with a downward direction being negative. It is possible to avoid interference of the projection lens 21 and the image element 11 with the see-through mirror 23 by setting the optical axis portion AX1 of the optical path P1 to be −30° or more downward in the Z direction. In addition, it is possible to prevent the projection lens 21 and the image element 11 from protruding upward and becoming visually noticeable by setting the optical axis portion AX1 of the optical path P1 to be +30° or less upward in the Z direction. In the optical path P2 from the inner reflection surface 22b to the see-through mirror 23, the optical axis portion AX2 is preferably kept within a range of an approximately −70° to −45° on average in the Z direction with the downward direction being negative. It is possible to avoid an excessive increase in the overall inclination of the see-through mirror 23 and to easily secure a space in which an inner lens is disposed inside the see-through mirror 23 by setting the optical axis portion AX2 of the optical path P2 to be −70° or more downward in the Z direction. In addition, it is possible to avoid arrangement of the prism mirror 22 such that it protrudes greatly in the −Z direction or a backward direction with respect to the see-through mirror 23 and to avoid an increase in a thickness of the imaging optical system 12 by setting the optical axis portion AX2 of the optical path P2 to be −45° or less downward in the Z direction. The optical path P3 from the see-through mirror 23 to the pupil position PP is in a state of being nearly parallel to the Z direction, but in the shown example, the optical axis portion AX3 is approximately −10° in the Z direction with the downward direction being negative. That is, an emission optical axis EX which is an extension of the optical axis portion AX3 is inclined downward by approximately 10° with respect to the +Z direction on the front side and extends. This is because a line of sight of a human being is stable in a slightly lowered eye state in which the line of sight is inclined downward by approximately 10° with respect to a horizontal direction. A central axis HX that extends in the horizontal direction with respect to the pupil position PP assumes a case in which the wearer US wearing the display device 100 relaxes in an upright posture and faces the front and gazes at the horizontal direction or the horizontal line. Although a shape and posture of the head including the arrangement of the eyes and the arrangement of the ears, and the like of the individual wearer US wearing the display device 100 are various, the average central axis HX can be set for the display device 100 of interest by assuming the average head shape or head position of the wearer US. As a result of the above, in the inner reflection surface 22b of the prism mirror 22, a reflection angle of the light rays along the optical axis AX is approximately 10° to 60°. Further, in the see-through mirror 23, the reflection angle of the light rays along the optical axis AX is approximately 20° to 45°.

Figure 4:
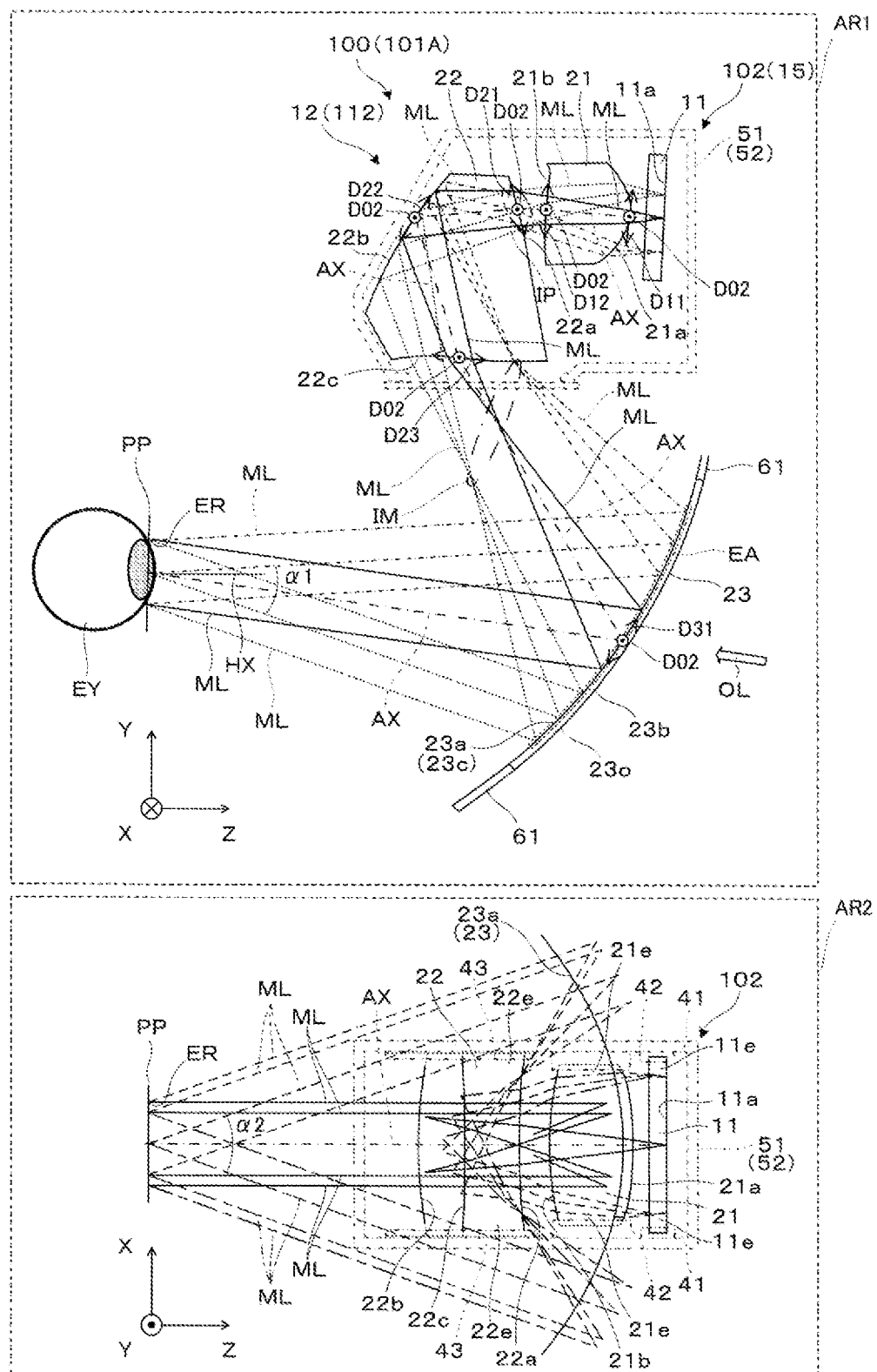
FIG. 4 is a side cross-sectional view and a partial cross-sectional plan view of the display device.

The display drive part 102 will be described in detail with reference to FIG. 4. In FIG. 4, a region AR1 shows a side cross-sectional view of the imaging optical system 12 and the like, and a region AR2 shows a plan view of the imaging optical system 12 and the like. In the region AR2, the optical surfaces 21a and 21b of the projection lens 21, the optical surfaces 22a, 22b, and 22c of the prism mirror 22, and the reflection surface 23a of the see-through mirror 23 are shown in a state in which they are projected onto an X-Z plane through the optical axis AX.

A side end portion 11e of the image element 11 constituting the display drive part 102, that is, the optical unit 15, is held by a pair of support members 41 that protrudes inward of the case 51 which is shown by an alternating long and short dash line. Alignment of the image element 11 in the case 51 is achieved by these support members 41. A side end portion 21e of the projection lens 21 constituting the optical unit 15 is held by a pair of support members 42 that protrudes inward of the case 51. Alignment of the projection lens 21 with respect to the case 51 is achieved by these support members 42. A side end portion 22e of the prism mirror 22 constituting the optical unit 15 is also held by a pair of support members 43 that protrudes inward of the case 51. Alignment of the prism mirror 22 with respect to the case 51 is achieved by these support members 43. In the shown example, the end portion 21e of the projection lens 21 is disposed in the case 51, but the end portion 21e may be exposed to the outside at a side wall of the case 51. Similarly, the end portion 22e of the prism mirror 22 does not need to be disposed in the case 51, and the end portion 21e may be exposed to the outside at the side wall of the case 51. The frame 52 of the case 51 may be constituted by a combination of frame members that are divided in half by a plane parallel to the Y-Z plane, for example, and the image element 11, projection lens 21, and the like can be aligned and incorporated therein when the frame members are joined. The case 51 is not limited to be constituted of two portions, and may be constituted of three or more portions.

The projection lens 21 is a single lens, and the incident surface 21a and the emission surface 21b which are the optical surfaces constituting the projection lens 21 have asymmetry with respect to longitudinal first directions D11 and D12 parallel to the Y-Z plane and intersecting the optical axis AX with the optical axis AX interposed therebetween, and have symmetry with respect to a transverse second direction D02 or the X direction orthogonal to the first directions D11 and D12 with the optical axis AX interposed therebetween. The longitudinal first direction D11 with respect to the incident surface 21a and the longitudinal second direction D12 with respect to the emission surface 21b form a predetermined angle.

The projection lens 21 may be formed of, for example, a resin, but may also be formed of glass. The incident surface 21a and the emission surface 21b of the projection lens 21 are freely-curved surfaces, for example. The incident surface 21a and the emission surface 21b are not limited to freely-curved surfaces, and may be aspherical surfaces. In the projection lens 21, an aberration reduction can be achieved by setting the incident surface 21a and the emission surface 21b to be freely-curved surfaces or aspherical surfaces, and, particularly when a freely-curved surface is used, and because the optical performance of an eccentric system is easily improved, an aberration of the imaging optical system 12 which is a non-coaxial off-axis optical system 112 can be easily reduced. The freely-curved surface is a surface without an axis of rotational symmetry, and various polynomials may be used as a surface function of the freely-curved surface. In addition, the aspherical surface is a surface having an axis of rotational symmetry and represented by a polynomial, but is a paraboloid or a surface other than a spherical surface. Although detailed illustration is omitted, an antireflection layer is formed on the incident surface 21a and the emission surface 21b.

The prism mirror 22 is a refractive reflection optical member having a function of combining a mirror and a lens, and reflects the image light ML from the projection lens 21 while refracting it. More specifically, in the prism mirror 22, the image light ML is incident on the inside via the light incident surface 22a which is the refraction surface, is totally reflected in a non-forward direction by the inner reflection surface 22b which is the reflection surface, and is emitted to the outside via the light emission surface 22c which is the refraction surface. The light incident surface 22a and the light emission surface 22c are optical surfaces formed of curved surfaces, and contribute to resolution improvement compared to a case in which they are only the reflection surfaces or they are flat surfaces. The light incident surface 22a, the inner reflection surface 22b, and the light emission surface 22c which are the optical surfaces constituting the prism mirror 22 have asymmetry with respect to the longitudinal first directions D21, D22, and D23 parallel to the Y-Z plane and intersecting the optical axis AX with the optical axis AX interposed therebetween, and have symmetry with respect to the transverse second direction D02 or the X direction orthogonal to the first directions D21, D22, and D23 with the optical axis AX interposed therebetween.

The prism mirror 22 may be formed of, for example, a resin, but may also be formed of glass. A refractive index of a main body of the prism mirror 22 is set to a value such that total reflection on the inner surface is achieved in consideration of a reflection angle of the image light ML. A refractive index and an Abbe number of the main body of the prism mirror 22 are preferably set in consideration of a relationship with the projection lens 21. In particular, color dispersion remaining as a whole is reduced by increasing the Abbe number of the prism mirror 22 and the projection lens 21.

The optical surface of the prism mirror 22, that is, the light incident surface 22a, the inner reflection surface 22b, and the light emission surface 22c are, for example, freely-curved surfaces. The light incident surface 22a, the inner reflection surface 22b, and the light emission surface 22c are not limited to freely-curved surfaces, and may be aspherical surfaces. In the prism mirror 22, the aberration reduction can be achieved by setting the optical surfaces 22a, 22b, and 22c to be freely-curved surfaces or aspherical surfaces, and, in particular, when a freely-curved surface is used, the optical performance of the eccentric system is easily improved. That is, the aberration of the imaging optical system 12 which is the non-coaxial off-axis optical system 112 is easily reduced, and the resolution can be improved. The inner reflection surface 22b is not limited to one that reflects the image light ML by total reflection, and may be a reflection surface formed of a metal film or a dielectric multilayer film. In this case, a reflection film formed of a single layer film or multilayer film formed of a metal such as Al or Ag is formed on the inner reflection surface 22b by vapor deposition or the like, or a sheet-shaped reflection film formed of a metal is affixed thereto. Although detailed illustration is omitted, an antireflection layer is formed on the light incident surface 22a and the light emission surface 22c.

The see-through mirror 23 is a plate-shaped optical member that serves as a concave surface mirror, and reflects the image light ML from the prism mirror 22. That is, the see-through mirror 23 reflects the image light ML from an emission region of the image source 10 toward the pupil position PP. The see-through mirror 23 covers the pupil position PP at which the eye EY or the pupil is disposed, has a concave shape toward the pupil position PP, and has a convex shape toward the outside. The see-through mirror 23 is a concave transmission mirror that covers the entire effective region of a screen in the view. The see-through mirror 23 is a collimator having a convergence function, and converges the main ray of the image light ML temporarily spread by imaging in the vicinity of the emission region of the image source 10, which is the main ray of the image light ML emitted from each of points on the display surface 11a, at the pupil position PP. The see-through mirror 23 is a mirror plate having a structure in which a mirror film 23c is formed on a front surface or a back surface of a plate-shaped body 23b. The reflection surface 23a of the see-through mirror 23 has transmissive properties. The see-through mirror 23 and the reflection surface 23a have asymmetry with respect to the longitudinal first direction D31 parallel to the Y-Z plane and intersecting the optical axis AX with the optical axis AX interposed therebetween, and have symmetry with respect to the transverse second direction D02 or the X direction orthogonal to the first direction D31 with the optical axis AX interposed therebetween.

The reflection surface 23a of the see-through mirror 23 is, for example, a freely-curved surface. The reflection surface 23a is not limited to a freely-curved surface, and may be an aspherical surface. The aberration reduction can be achieved by setting the see-through mirror 23 to be a freely-curved surface or an aspherical surface, and, in particular, when a freely-curved surface is used, the aberration of the imaging optical system 12 which is an off-axis optical system or a non-coaxial optical system can be easily reduced. The see-through mirror 23 has a shape in which the origin of a curved surface expression is shifted toward the projection lens 21 side or the image element 11 side from the effective region of the see-through mirror 23, even when the reflection surface 23a is any one of a freely-curved surface and an aspherical surface. In this case, an inclined surface of the see-through mirror that realizes a Z shaped optical path without imposing an excessive burden on the design of the optical system can be set.

The third mirror member 23 is a transmissive type reflection element that allows transmission of some of light upon reflection, and the mirror film 23c of the see-through mirror 23 is formed by a reflection layer having a semi-transmissive property. Thus, because outside light OL passes through the see-through mirror 23, see-through view of the outside is enabled, and a virtual image can be superimposed on an outside image. At this time, when the plate-shaped body 23b has a thickness of less than or equal to approximately a few millimeters, a change in magnification of the outside image can be curbed to be small. A reflectance of the mirror film 23c with respect to the image light ML and the outside light OL is set to 10% or more and 50% or less in a range of an incident angle of the assumed image light ML from the viewpoint of ensuring a brightness of the image light ML and facilitating observation of the outside image by see-through. The plate-shaped body 23b which is a base material of the see-through mirror 23 is formed of, for example, a resin, and may also be formed of glass. The plate-shaped body 23b is formed of the same material as the support plate 61 that supports the plate-shaped body 23b from the surrounding thereof, and has the same thickness as the support plate 61. The mirror film 23c is formed of, for example, a dielectric multilayer film configured of a plurality of dielectric layers having an adjusted film thickness. The mirror film 23c may be a single-layer film or a multilayer film of a metal such as Al or Ag of which a film thickness has been adjusted. The mirror film 23c may be formed by laminating, and may also be formed by affixing a sheet-shaped reflection film. An antireflection layer is formed on an outer surface 23o of the plate-shaped body 23b.

In the imaging optical system 12, an intermediate pupil IP is disposed on the light incident surface 22a side of the prism mirror 22 from the projection lens 21 and the inner reflection surface 22b between the projection lens 21 and the inner reflection surface 22b of the prism mirror 22. More specifically, the intermediate pupil IP is disposed at or near a position of the light incident surface 22a of the prism mirror 22. The intermediate pupil IP means a place at which the image light from each of points on the display surface 11a spreads most and overlaps each other, and is disposed at a conjugate point of the eye ring ER or pupil position PP. Preferably, an aperture diaphragm is disposed at or near a position of the intermediate pupil IP.

An intermediate image IM is formed between the prism mirror 22 and the see-through mirror 23. The intermediate image IM is formed closer to the prism mirror 22 than to the see-through mirror 23. In this way, the burden of enlargement by the see-through mirror 23 can be reduced, and thus the aberration of the observed virtual image can be curbed by forming the intermediate image IM closer to the prism mirror 22 than to the see-through mirror 23. The intermediate image IM is a real image formed at a conjugate position with respect to the display surface 11a, which is located upstream from the eye ring ER in the optical path, and has a pattern corresponding to a displayed image on the display surface 11a, but it does not need to be a sharply imaged one, and may one which exhibits various aberrations such as curvature of an image surface and distortion aberration.

In describing the optical path, the image light ML from the image element 11 is emitted in a state in which it is incident on the projection lens 21 and is substantially collimated. The image light ML that has passed through the projection lens 21 is incident on the prism mirror 22, passes through the light incident surface 22a while being refracted by it, is reflected by the inner reflection surface 22b with a high reflectance close to 100%, and is refracted again by the light emission surface 22c. The image light ML from the prism mirror 22 is incident on the see-through mirror 23 and is reflected by the reflection surface 23a with a reflectance of about 50% or less. The image light ML reflected by the see-through mirror 23 is incident on the pupil position PP at which the eye EY or pupil of the wearer US is placed. The outside light OL that has passed through the see-through mirror 23 and the support plate 61 therearound is also incident on the pupil position PP. In other words, the wearer US wearing the display device 100 can observe a virtual image of the image light ML in a state in which it overlaps the outside image.

As is clear from a comparison with regions AR1 and AR2 in FIG. 4, FOV of the imaging optical system 12 has a transverse viewing angle α2 larger than a longitudinal viewing angle α1. This corresponds to one in which the display image formed on the display surface 11a of the image element 11 is long in the horizontal direction. An aspect ratio of the transverse to the longitudinal is set to a value such as 4:3 or 16:9.

Figure 5:
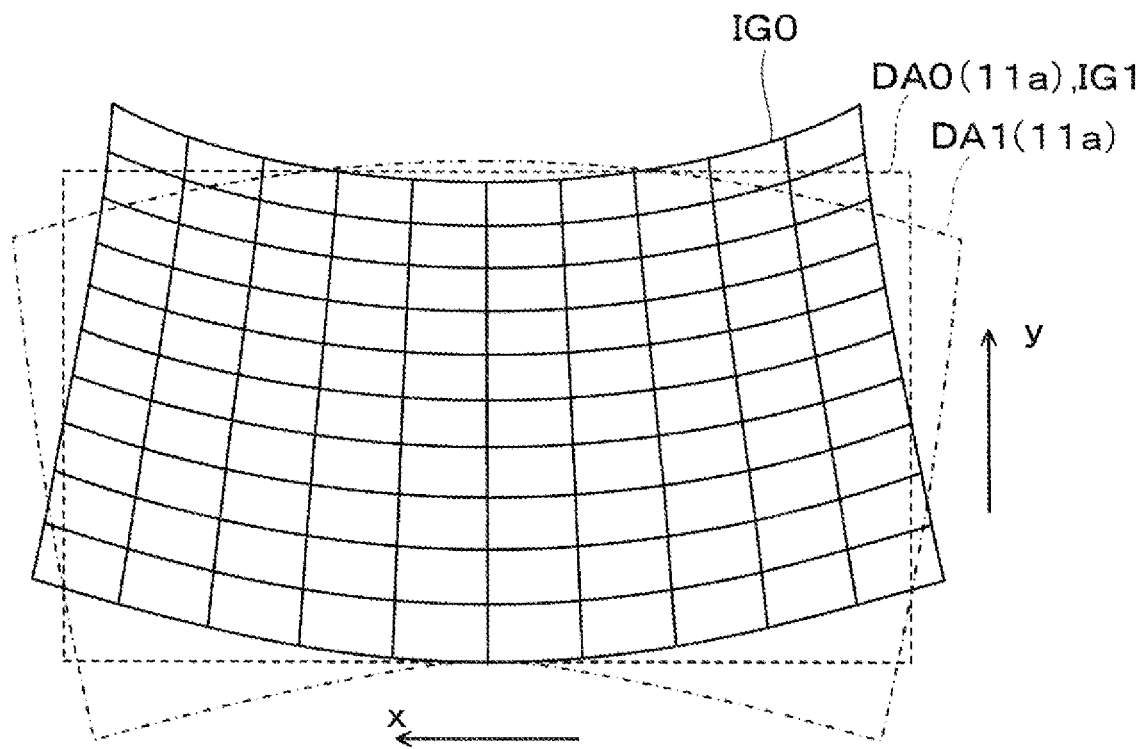
FIG. 5 is a diagram showing forced distortion of a display image formed on an image element.

As shown in FIG. 5, an original projected image IG0 indicating an imaging state by the imaging optical system 12 has a relatively large distortion. Because the imaging optical system 12 is the off-axis optical system 112, it is not easy to remove distortion such as trapezoidal distortion. Thus, even in a case in which the distortion remains in the imaging optical system 12, the display image formed on the display surface 11a is a modified image DA1 having distortion such as trapezoidal distortion in advance when the original display image is DA0. In other words, the image displayed on the image element 11 is caused to have a reverse distortion that cancels the distortion formed by the projection lens 21, the prism mirror 22, and the see-through mirror 23, thus a pixel array of a projected image IG1 of the virtual image observed at the pupil position PP via the imaging optical system 12 may be a grid pattern corresponding to the original display image DA0, and the contour can be rectangular. As a result, aberrations can be curbed as a whole including the image element 11 while the distortion aberration generated by the see-through mirror 23 and the like is allowed. As a result, the degree of freedom in the arrangement and size of optical elements such as the prism mirror 22 is increased, and it is possible to easily secure the optical performance of the display device 100 while miniaturization of the display device 100 is achieved.

In the above-described embodiment, although the image element 11, the projection lens 21, and the like are aligned by the case 51, the present disclosure is not limited thereto.

For example, a lens barrel may be provided separately from the case 51, the projection lens 21 and the prism mirror 22 may be assembled into the lens barrel, and the lens barrel in which the projection lens 21 and the like are assembled may be fixed in the case 51.

The case 51 is not limited to a completely sealed case, and a vent may be provided in a part of the case 51. The vent may include a valve or a filter. For example, the filter may allow air to pass through but may block dirt and dust.

In the display device 100 according to the above-described first embodiment, because the light emission side of the image source 10 is covered with the light transmission window 153 that blocks dust, it is possible to avoid contamination of the optical surface (for example, the light emission surface 22c) of one or more optical elements constituting the image source 10 with dirt, dust, or the like that has entered from the outside, and thus degradation of the optical performance due to use can be curbed.

Second Embodiment

Hereinafter, a display device and the like according to a second embodiment of the present disclosure will be described. The display device of the second embodiment is obtained by modifying a part of the display device of the first embodiment, and description of common parts will be omitted.

Figure 6:
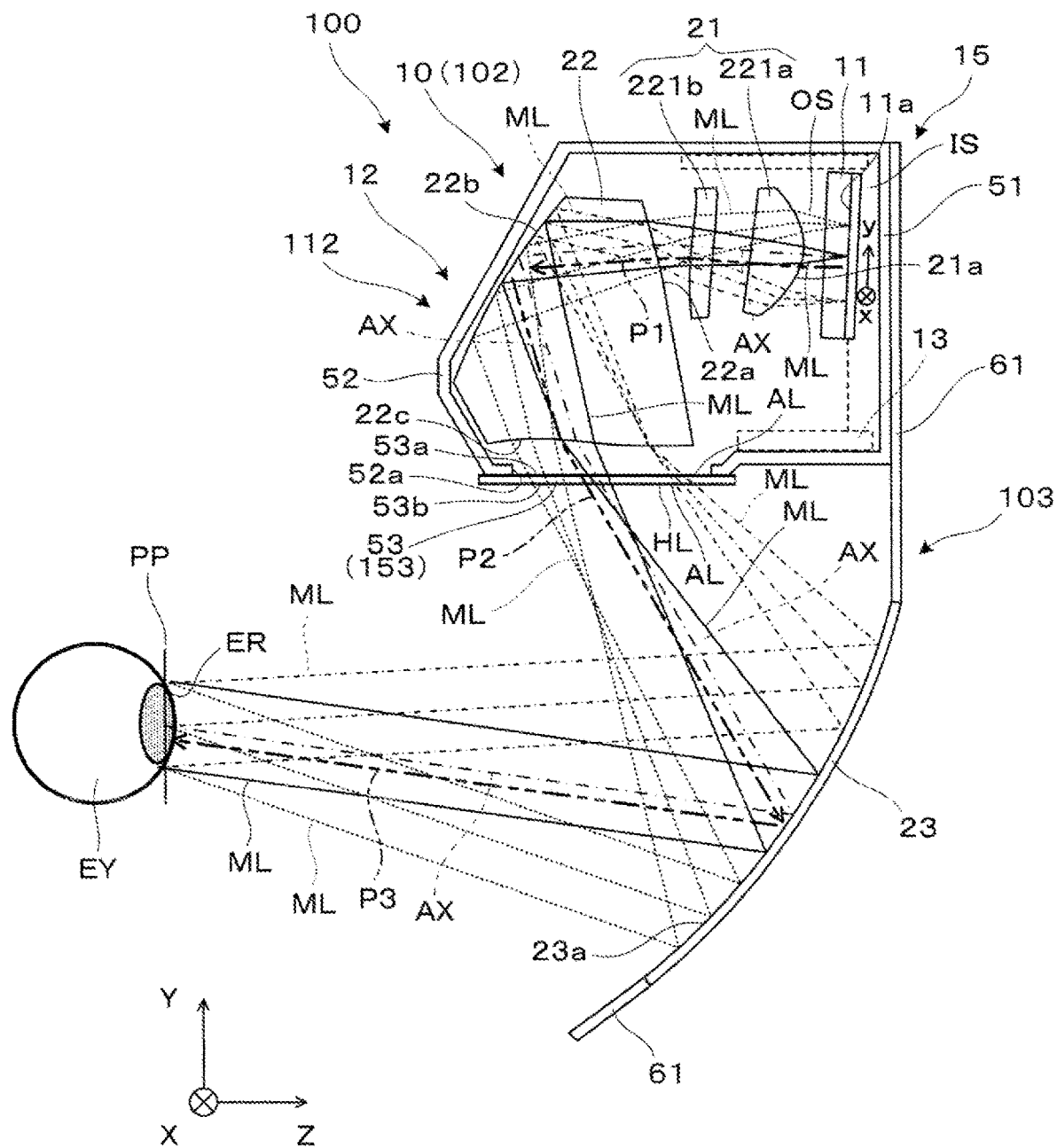
FIG. 6 is a side cross-sectional view showing a structure of a display device according to a second embodiment.

The display device of the second embodiment will be described with reference to FIG. 6. In the display device 100 of the present embodiment, the projection lens 21 includes two lens elements 221a and 221b. Four optical surfaces constituting both lens elements 221a and 221b have asymmetry in the up-down direction parallel to the Y-Z plane and intersecting the optical axis AX with the optical axis AX interposed therebetween, and have symmetry with respect to the transverse direction parallel to the X direction with the optical axis AX interposed therebetween. The projection lens 21 may include three or more lens elements. When the projection lens 21 includes a plurality of lens elements 221a, 221b, . . . , the optical performance is easily improved by a plurality of optical surfaces of the plurality of lens elements 221a, 221b, . . . .

Third Embodiment

Hereinafter, a display device and the like according to a third embodiment of the present disclosure will be described. The display device of the third embodiment is obtained by modifying a part of the display device of the first embodiment, and description of common parts will be omitted.

The display device of the third embodiment will be described with reference to FIG. 7. In the display device 100 according to the present embodiment, the image element 11, the projection lens 21, and the prism mirror 22 are fixed into the case 51. However, in the opening 52a of the case 51, the light emission surface 22c of the prism mirror 22 is exposed to the outside air. In other words, a light emission part 22p which is a surface layer portion including the light emission surface 22c of the prism mirror 22 serves as the light transmission window 153. The light transmission window 153 is fixed to a bottom plate 52f at a peripheral edge of the opening 52a formed in the bottom plate 52f of the case 51 as a part of the prism mirror 22.

Figure 7:
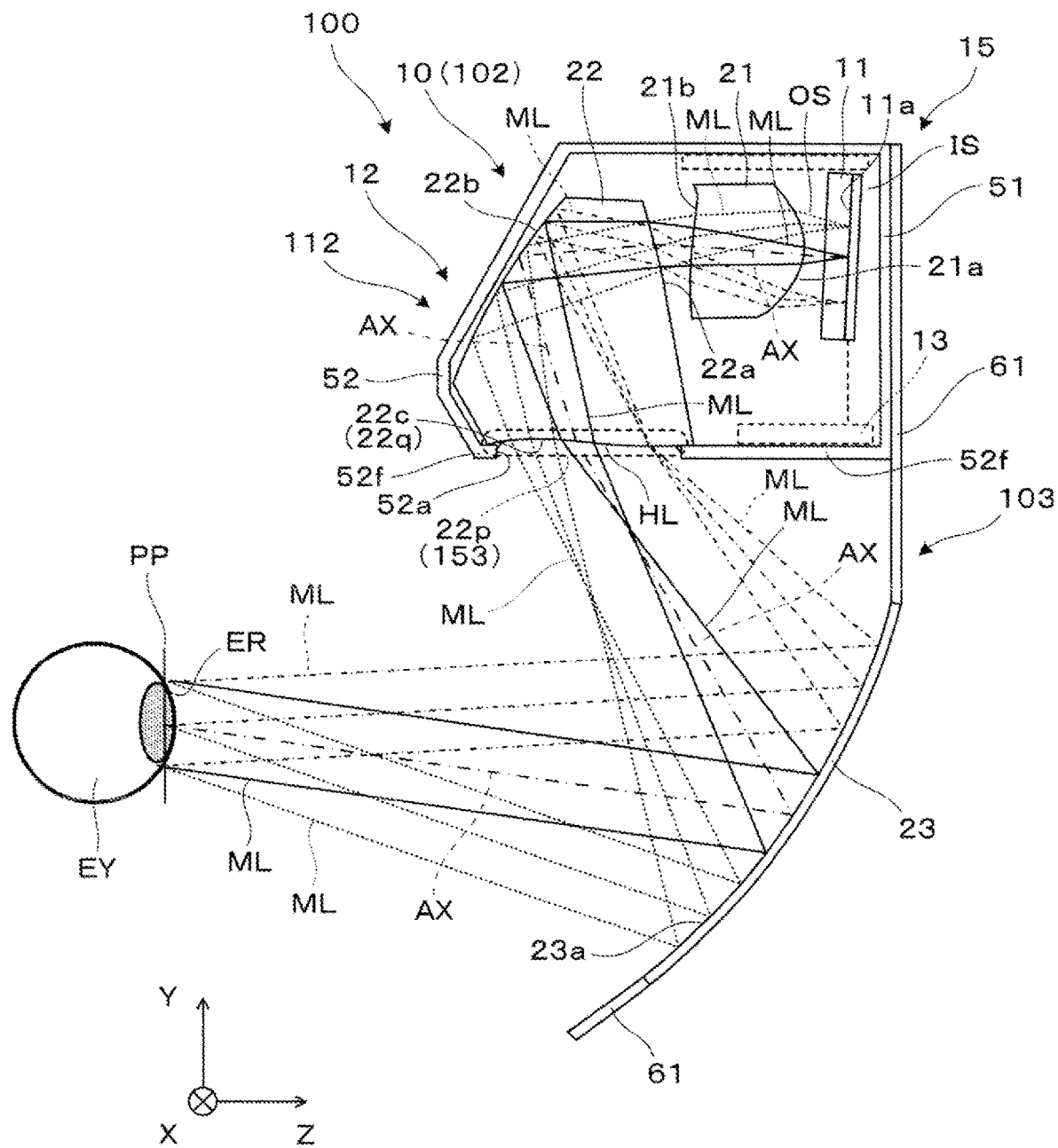
FIG. 7 is a side cross-sectional view showing a structure of a display device according to a third embodiment.

In the case of the display device 100 shown in FIG. 7, the light emission part 22p which is a surface layer portion including the light emission surface 22c of the prism mirror 22 serves as the light transmission window 153. In other words, the light emission part 22p includes the optical surface of the prism mirror 22 and is a part for extracting the image light ML to the outside of the image source 10 or the optical unit 15. In this case, the image element 11, the projection lens 21, and the like are built into the case 51, and the light incident surface 22a and the inner reflection surface 22b of the prism mirror 22 are also disposed in the case 51. Because the prism mirror 22 is formed of a material having light transmissive properties, and an antireflection layer is formed on the light emission surface 22c, the light emission part 22p allows the image light ML to pass through with little loss. The light emission part 22p which is the light transmission window 153 is supported by the case 51 while being sealed at an outer edge thereof via a shielding structure or a sealing structure. The light emission part 22p and the like allow the light emission surface 22c of the prism mirror 22 and other surfaces to be spatially blocked or separated while enabling the emission of the image light ML to the outside of the case 51, and it is possible to prevent dust, moisture, steam, and the like from outside of the case 51 from entering the interior IS of the case 51. Thus, it is possible to prevent the optical surface such as the light incident surface 22a of the prism mirror 22 from being contaminated with dust or dirt, or to prevent the optical surface from becoming cloudy. In other words, the light transmission member 53 generates not only a dust-proof effect but also a drip-proof and moisture-proof effect. When the light transmission window 153 is a light emission part including the light emission surface 22c of the prism mirror 22, there is no need to separately incorporate the light transmission member, and it becomes easy to achieve a low weight and miniaturization of the display device 100.

An antireflection layer 22q is formed on the light emission surface 22c of the prism mirror 22. When the prism mirror 22 is formed of a resin material, for example, a hard coating layer HL is preferably formed as a base of the antireflection layer. A coating layer having antifouling properties may also be provided on the light emission surface 22c.

Fourth Embodiment

Hereinafter, a display device and the like according to a fourth embodiment of the present disclosure will be described. The display device of the fourth embodiment is obtained by modifying a part of the display device of the first embodiment, and description of common parts will be omitted.

Figure 8:
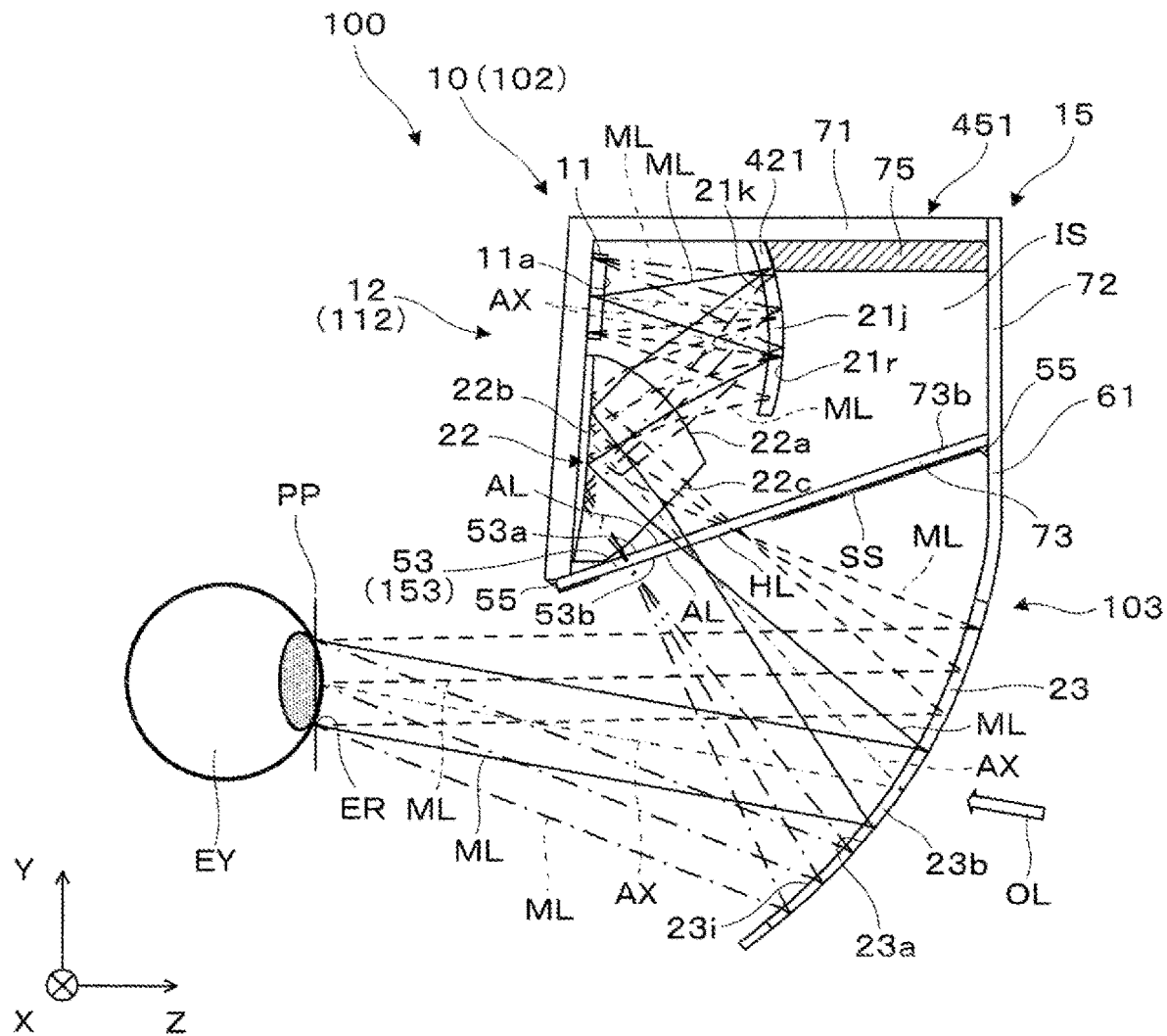
FIG. 8 is a side cross-sectional view showing a structure of a display device according to a fourth embodiment.

The display device of the fourth embodiment will be described with reference to FIG. 8. In the display device 100 of the present embodiment, the imaging optical system 12 includes a reflection mirror 421, a prism mirror 22, and a see-through mirror 23.

The reflection mirror 421 is provided instead of the projection lens 21 according to the first embodiment. The reflection mirror 421 is a third mirror that reflects the image light ML before the image light ML emitted from the image element 11 is incident on the prism mirror 22. The number of times of bending of the optical path is increased compared to the case in the first embodiment by the reflection mirror 421. The reflection mirror 421 has a positive power that concentrates the image light ML emitted from the image element 11 when it is reflected. Similar to the projection lens 21, the reflection mirror 421 has asymmetry with respect to the up-down direction parallel to the Y-Z plane and intersecting the optical axis AX with the optical axis AX interposed therebetween, and has symmetry with respect to the transverse direction parallel to the X direction with the optical axis AX interposed therebetween. The reflection mirror 421 is a back surface reflection type element and has a reflection surface 21r on the back surface side of a plate-shaped body 21j, but a reflection surface may be provided on the front surface side. When the reflection surface 21r is provided on the back surface side as shown in the drawing, an antireflection layer is preferably formed on the front side surface 21k. Similar to the case of the first embodiment, the prism mirror 22 has the light incident surface 22a, the inner reflection surface 22b, and the light emission surface 22c, causes the image light ML emitted from the reflection mirror 421 to be incident on the light incident surface 22a, totally reflects the image light ML with the inner reflection surface 22b, and emits the image light ML from the light emission surface 22c. The see-through mirror 23 reflects the image light ML emitted from the prism mirror 22 toward the pupil position PP. The see-through mirror 23 is a back surface reflection type element, and has a reflection surface 23a on the back surface side of the plate-shaped body 23b. An antireflection layer is formed on an inner surface 23i of the plate-shaped body 23b. The reflective surface 23a of the see-through mirror 23 is formed by a reflection layer having semi-transmissive properties. The configuration in which the reflection mirror 421, the prism mirror 22, and the see-through mirror 23 constitute the off-axis optical system 112 is the same as that of the first embodiment.

In the optical unit 15 or the image source 10, the image element 11, the reflection mirror 421, and the prism mirror 22 are accommodated in the case 451. The case 451 includes a support structure 75, a first cover member 71, a second cover member 72, and a third cover member 73. The support structure 75 supports the reflection mirror 421 and supports the first cover member 71 and the second cover member 72. The first cover member 71 covers the upper side, the rear side, and the lateral side of the optical unit 15, the second cover member 72 covers the front side of the optical unit 15, and the third cover member 73 covers the lower side in the optical unit 15. The first cover member 71 supports the image element 11 and the prism mirror 22 in a state in which they are aligned in the case 451. The second cover member 72 is a part of the support plate 61 and indirectly supports the see-through mirror 23. The first cover member 71 and the second cover member 72 are formed of a light shielding metal material or resin material. When the first cover member 71 and the like are formed of a resin material, a black light shielding material may be applied to the inner surface side of a resin substrate. The third cover member 73 includes a light transmission member 53 in a local region corresponding to the optical path of the image light ML. The light transmission member 53 is a light transmission window 153 that covers the light emission side of the image source 10 including the prism mirror 22. The third cover member 73 is airtightly fixed to the first cover member 71 and the second cover member 72 using, for example, an adhesive 55. The first cover member 71 and the second cover member 72 are also joined to each other in an air-tight manner using an adhesive or a sealing member (not shown).

The inside and outside of the light transmission member 53 can be spatially blocked or separated while the emission of the image light ML is allowed, and dust, moisture, steam, and the like outside the case 51 can be prevented from entering the interior IS by covering the light emission part of the case 51 with the light transmission member 53 of the third cover member 73. Thus, it is possible to prevent the optical surface of the optical element built into the optical unit 15, such as the prism mirror 22, from being contaminated with dust or dust, or to prevent the optical surface from becoming cloudy. In other words, the light transmission member 53 generates not only a dust-proof effect but also a drop-proof and moisture-proof effect. The third cover member 73 is a parallel flat plate having a thickness of approximately 0.5 to 2 mm. In other words, an incident surface 53a and an emission surface 53b of the light transmission member 53 formed in a partial region of the third cover member 73 are flat surfaces with little effect on imaging by the image light ML. The third cover member 73 including the light transmission member 53 may be formed of a resin plate having rigidity, and may also be formed of dust-proof glass. When the light transmission member 53 is formed of a resin plate, an antireflection layer AL is formed on the incident surface 53a, and a hard coating layer HL and an antireflection layer AL are formed on the emission surface 53b. When the light transmission member 53 is formed of dust-proof glass, the antireflection layer AL is formed on the incident surface 53a or the emission surface 53b, but the hard coating layer HL is not formed. A light shielding part SS is formed in a peripheral region 73b of the third cover member 73 excluding the light transmission member 53 to prevent stray light from being generated. The light shielding part SS is formed by applying a black light shielding material or affixing a black light shielding sheet.

In the above description, the support structure 75, the first cover member 71, and the second cover member 72 are formed separately, but they may be integrally formed. Further, the light transmission member 53 and the peripheral region 73b that constitute the third cover member 73 may be formed separately, and the light transmission member 53 may be joined to the peripheral region 73b or the like.

The reflection mirror 421 may be replaced with a prism mirror having one or more refraction surfaces.

Fifth Embodiment

Hereinafter, a display device and the like according to a fifth embodiment of the present disclosure will be described. The display device of the fifth embodiment is obtained by modifying a part of the display device of the fourth embodiment, and description of common parts will be omitted.

The display device of the fifth embodiment will be described with reference to FIG. 9. In the display device 100 of the present embodiment, the image element 11, the reflection mirror 421, and the prism mirror 22 are fixed into the case 51. However, in the opening 52a provided in the bottom plate 52f of the case 51, the light emission surface 22c of the prism mirror 22 is exposed to the outside air. In other words, the light emission part 22p which is a surface layer portion including the light emission surface 22c of the prism mirror 22 serves as a light transmission window 153. The light transmission window 153 is fixed to the bottom plate 52f at the peripheral edge of the opening 52a formed in the bottom plate 52f of the case 51 as a part of the prism mirror 22. The second cover member 72 of the case 51 is formed separately from the support plate 61 and supports an upper end of the support plate 61 by joining or the like.

Figure 9:
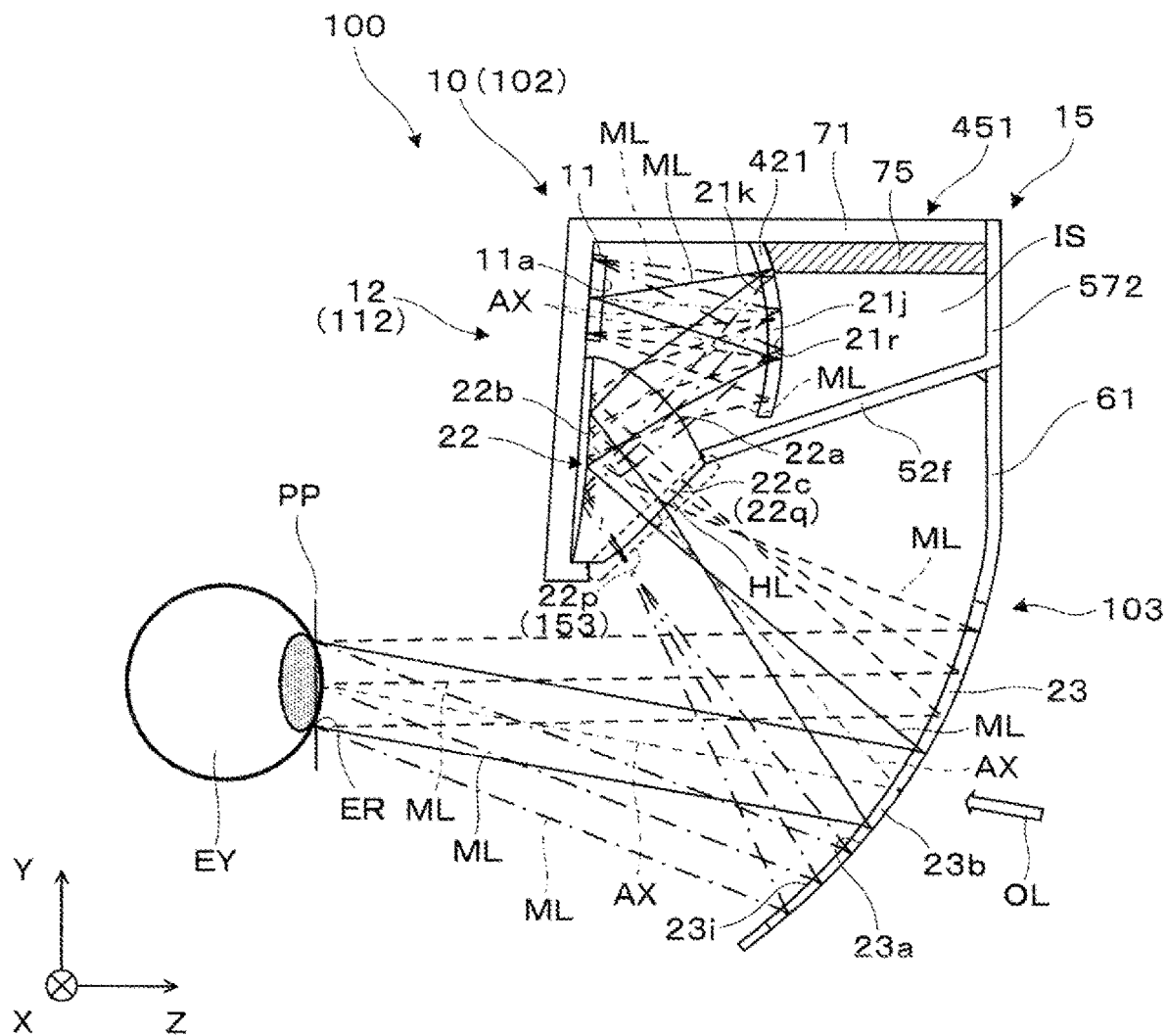
FIG. 9 is a side cross-sectional view showing a structure of a display device according to a fifth embodiment.

In the case of the display device 100 shown in FIG. 9, the light emission part 22p of the prism mirror 22 serves as the light transmission window 153. In other words, the light emission part 22p includes the optical surface of the prism mirror 22 and is a part for extracting the image light ML to the outside of the image source 10 or the optical unit 15. In this case, the image element 11, the projection lens 21, and the like are built into the case 51, and the light incident surface 22a and the inner reflection surface 22b of the prism mirror 22 are also disposed in the case 51. Because the prism mirror 22 is formed of a material having light transmissive properties, and an antireflection layer is formed on the light emission surface 22c, the light emission part 22p allows the image light ML to pass with little loss. The light emission part 22p which is the light transmission window 153 is supported at an outer edge thereof by the case 51 that is sealed via a shielding structure or a sealing structure. The light emission part 22p and the like allow the light emission surface 22c of the prism mirror 22 and other surfaces to be spatially blocked or separated while the light emission part 22p and the like is allowed to emit the image light ML to the outside of the case 51, and it is possible to prevent dust, moisture, steam, and the like outside the case 51 from entering the interior IS of the case 51. Thus, it is possible to prevent the optical surface such as the light incident surface 22a of the prism mirror 22 from being contaminated with dust or dust, or to prevent the optical surface from becoming cloudy. In other words, the light transmission member 53 generates a dust-proof effect as well as a drop-proof and moisture-proof effect.

An antireflection layer 22q is formed on the light emission surface 22c of the prism mirror 22. When the prism mirror 22 is formed of a resin material, for example, a hard coating layer HL is preferably formed as a base of the antireflection layer. A coating layer having antifouling properties may be provided on the light emission surface 22c.

Modified Examples and Others

The present disclosure is described according to the above-described embodiments, but the present disclosure is not limited to the above-described embodiments. The present disclosure may be carried out in various modes without departing from the gist of the present disclosure, and, for example, the following modifications may be carried out.

In the display device 100 of the above-described embodiment, a light emitting type display device such as an organic EL element, an LCD, and other light modulation elements are used as the image element 11, but instead of them, a configuration using a laser scanner that combines a laser light source and a scanner such as a polygon mirror may also be used. That is, it is also possible to apply the present disclosure to a laser retinal projection type head-mounted display.

A light control device that controls light by limiting transmitted light of the see-through mirror 23 may be mounted on the outside of the see-through member 23. The light control device adjusts a transmittance, for example, electrically. Mirror liquid crystals, electronic shades, and the like may be used as the light control device. The light control device may adjust a transmittance according to outside light brightness.

In the description above, although it was assumed that the display device 100 was worn on the head and is used, the display device 100 may also be used as a handheld display that is not worn on the head and is to be looked into like binoculars. In other words, the head-mounted display also includes a hand-held display in the present disclosure.

In the above-described embodiment, although the image source 10 is a combination of the image element 11, the projection lens 21, and the prism mirror 22, or a combination of the image element 11, the reflection mirror 421, and the prism mirror 22, the image source 10 may be a combination of the image element 11 and the prism mirror 22, or a combination of the image element 11 and the projection lens 21.

A display device according to a specific aspect includes: an image element, a prism mirror that receives image light emitted from the image element through a light incident surface, reflects the image light with an inner reflection surface, and emits the image light from a light emission surface, and a see-through mirror that reflects the image light emitted from the prism mirror toward a pupil position, wherein the prism mirror emits the image light so that the image light is returned in a direction inclined with respect to an incident direction, and a light emission side of an image source that includes the image element and the prism mirror is covered with a light transmission window that blocks dust.

In the above-described display device, because the light emission side of the image source is covered with the light transmission window that blocks dust, it is possible to avoid contamination of the optical surfaces of the one or more optical elements constituting the image source with dust, dirt, or the like that has entered from the outside, and thus degradation of the optical performance due to use can be curbed.

In a specific aspect, the light transmission window is disposed between the prism mirror and the see-through mirror. In this case, the optical surface of the prism mirror is protected.

In another aspect, the light transmission window is a flat plate-shaped light transmission member having rigidity. Due to the light transmission member having rigidity, damage to the light transmission window is easily prevented, and due to the light transmission member having a flat plate shape, it is possible to ensure a low weight while affecting the optical performance is avoided.

In another aspect, the light transmission window is dust-proof glass. A high-performance optical surface can be formed on the dust-proof glass, and thus the optical performance of the display device can be easily maintained.

In another aspect, the light transmission window is a resin plate, and a hard coating layer is formed on an emission surface thereof. The hard coating layer prevents the light transmission window from being damaged by an external force, and curbs degradation of the optical performance due to use.

In another aspect, an antireflection layer is formed on an incident surface and an emission surface of the light transmission window. The antireflection layer can curb occurrence of ghosts.

In another aspect, the light transmission window is a light emission part that includes the light emission surface of the prism mirror. In this case, there is no need to incorporate a member such as a light transmission member, and thus low weight and miniaturization of the display device can be easily achieved.

In another aspect, the image element and the prism mirror are supported by a frame having air tightness. The frame can prevent an inner surface of the prism mirror and a display surface of the image element from being contaminated with dust or dirt.

In another aspect, the frame constitutes a case that seals an optical path space from the image element to the prism mirror.

In another aspect, a light emission part that includes the light emission surface of the prism mirror serves as the light transmission window.

In another aspect, the frame has a light shielding part formed along an outer edge of the light transmission window. The light shielding part may prevent unwanted light rays from being incident on the pupil.

In another aspect, the frame supports the see-through mirror. In this case, the see-through mirror is stably supported by the prism mirror or the like via the frame.

In another aspect, the light incident surface, the inner reflection surface, and the light emission surface of the prism mirror are freely-curved surfaces. The optical performance of the eccentric system can be easily improved by the prism mirror including the freely-curved surface.

In another aspect, the image source includes a projection lens through which the image light emitted from the image element passes before the image light is incident on the prism mirror.

In another aspect, the projection lens includes a plurality of lens elements. A plurality of optical surfaces of the plurality of lens elements can easily improve the optical performance.

In another aspect, the image source includes a third mirror that reflects the image light before the image light emitted from the image element is incident on the prism mirror.

In another aspect, the image source is an off-axis optical system that includes optical axis portions that are disposed along a predetermined reference plane and inclined to each other before and after the reflection surface.

In another aspect, the predetermined reference plane extends in an up-down direction. In this case, the optical elements constituting the display device are disposed in the up-down direction, and an increase in a transverse width of the display device can be prevented.

In another aspect, an optical system that includes the prism mirror and the see-through mirror generates distortion, and the image element corrects the distortion. In this case, the degree of freedom in the arrangement and size of the optical elements such as the prism mirror and the like is increased, and it is possible to easily ensure the optical performance of the display device while miniaturization of the display device is achieved.

In a specific aspect, an optical unit includes an image element, and a prism mirror that receives image light emitted from the image element through a light incident surface, reflects the image light with an inner reflection surface, and emits the image light from a light emission surface, wherein the prism mirror emits the image light incident from a front to be bent in a direction inclined with respect to the front, and a light emission side of an image source that includes the image element and the prism mirror is covered with a light transmission window that blocks dust.

What is claimed is:

1. A display device comprising:
   an image element;
   a prism mirror that receives image light emitted from the image element through a light incident surface, reflects the image light with an inner reflection surface, and emits the image light from a light emission surface; and
   a see-through mirror that reflects the image light emitted from the prism mirror toward a pupil position, wherein
   the prism mirror emits the image light so that the image light is returned in a direction inclined with respect to an incident direction, and
   a light emission side of an image source that includes the image element and the prism mirror is covered with a light transmission window that blocks dust, wherein
   the light incident surface, the inner reflection surface, and the light emission surface of the prism mirror are freely-curved surfaces; and
   an antireflection layer is formed at both an incident surface and an emission surface of the light transmission window.

2. The display device according to claim 1, wherein the light transmission window is disposed between the prism mirror and the see-through mirror.

3. The display device according to claim 2, wherein the light transmission window is a flat plate-shaped light transmission member having rigidity.

4. The display device according to claim 3, wherein the light transmission window is dust-proof glass.

5. The display device according to claim 3, wherein the light transmission window is a resin plate, and a hard coating layer is formed at an emission surface thereof.

6. The display device according to claim 1, wherein the light transmission window is a light emission part that includes the light emission surface of the prism mirror.

7. The display device according to claim 1, wherein the image element and the prism mirror are supported by a frame having air tightness.

8. The display device according to claim 7, wherein the frame constitutes a case that seals an optical path space from the image element to the prism mirror.

9. The display device according to claim 7, wherein a light emission part that includes the light emission surface of the prism mirror serves as a light transmission window.

10. The display device according to claim 7, wherein the frame has a light shielding part formed along an outer edge of the light transmission window.

11. The display device according to claim 7, wherein the frame supports the see-through mirror.

12. The display device according to claim 1, wherein the image source includes a projection lens through which the image light emitted from the image element passes before the image light is incident on the prism mirror.

13. The display device according to claim 12, wherein the projection lens includes a plurality of lens elements.

14. The display device according to claim 1, wherein the image source includes a third mirror that reflects the image light before the image light emitted from the image element is incident on the prism mirror.

15. The display device according to claim 1, wherein the image source is an off-axis optical system that includes optical axis portions that are disposed along a predetermined reference plane and inclined to each other before and after the inner reflection surface.

16. The display device of claim 15, wherein the predetermined reference plane extends in an up-down direction.

17. The display device according to claim 1, wherein an optical system that includes the prism mirror and the see-through mirror generates distortion, and the image element corrects the distortion.

18. An optical unit comprising:
    an image element; and
    a prism mirror that receives image light emitted from the image element through a light incident surface, reflects the image light with an inner reflection surface, and emits the image light from a light emission surface, wherein
    the prism mirror emits the image light incident from a front to be bent in a direction inclined with respect to the front, and
    a light emission side of an image source that includes the image element and the prism mirror is covered with a light transmission window that blocks dust, wherein the light incident surface, the inner reflection surface, and the light emission surface of the prism mirror are freely-curved surfaces; and an antireflection layer is formed at both an incident surface and an emission surface of the light transmission window.

\* \* \* \* \*